United States Patent
Gierbauer

(10) Patent No.: US 8,868,771 B2
(45) Date of Patent: Oct. 21, 2014

(54) METHOD FOR TRANSMITTING DATA, AND NETWORK ELEMENT FOR A DATA NETWORK

(75) Inventor: Christian Gierbauer, Munich (DE)

(73) Assignee: Xieon Networks S.a.r.l., Luxembourg (LU)

( * ) Notice: Subject to any disclaimer, the term of this patent is extended or adjusted under 35 U.S.C. 154(b) by 1154 days.

(21) Appl. No.: 12/063,558

(22) PCT Filed: Aug. 3, 2006

(86) PCT No.: PCT/EP2006/065030
§ 371 (c)(1),
(2), (4) Date: Feb. 11, 2008

(87) PCT Pub. No.: WO2007/017462
PCT Pub. Date: Feb. 15, 2007

(65) Prior Publication Data
US 2010/0146032 A1    Jun. 10, 2010

(30) Foreign Application Priority Data
Aug. 9, 2005  (DE) .......................... 10 2005 037 580

(51) Int. Cl.
G06F 15/16    (2006.01)
G06F 15/177   (2006.01)
G06F 15/173   (2006.01)
H04J 3/16     (2006.01)
H04J 3/14     (2006.01)

(52) U.S. Cl.
CPC ....... *H04J 3/1611* (2013.01); *H04J 2203/0069* (2013.01); *H04J 2203/006* (2013.01); *H04J 2203/0094* (2013.01); *H04J 3/14* (2013.01)
USPC ........... 709/230; 709/220; 709/221; 709/232; 709/236; 709/238; 709/239; 370/464

(58) Field of Classification Search
USPC .................................. 370/464; 709/220, 201
See application file for complete search history.

(56) References Cited

U.S. PATENT DOCUMENTS

| | | | |
|---|---|---|---|
| 2002/0181479 A1* | 12/2002 | Okuno | 370/404 |
| 2004/0213149 A1 | 10/2004 | Mascolo | |
| 2005/0281197 A1* | 12/2005 | Honda | 370/235 |
| 2007/0121507 A1* | 5/2007 | Manzalini et al. | 370/235 |

OTHER PUBLICATIONS

Acharya et al., "PESO: Low Overhead Protection for Ethernet over SONET Transport", Mar. 2004, IEEE INFOCOM, p. 1-11.*
Itu, "ITU-T G. 7042/Y.1305—Link capacity adjustment scheme (LCAS) for virtual concatenated signals", Feb. 2004, ITU, p. 1-23.*

(Continued)

*Primary Examiner* — Taylor Elfervig
(74) *Attorney, Agent, or Firm* — Nelson Mullins Riley & Scarborough LLP

(57) ABSTRACT

The invention relates to a method for transmitting data in a data network using virtual containers, which are combined to form a virtual concatenated group by means of the Link Capacity Adjustment Scheme, LCAS. The virtual concatenated group is sub-divided on the send side into a first virtual concatenated group and a second virtual concatenated group. Data of a first type is inserted on the send side into the first virtual concatenated group and data of the second type is inserted into the second virtual concatenated group. Said data is then transmitted via the data network.

7 Claims, 2 Drawing Sheets

(56) References Cited

OTHER PUBLICATIONS

Guowei Shi; Qing Wang; Zhao Liu; Lieguang Zeng, "SDH Virtual Concatenation technique used in Ethernet data transport," Communications, Circuits and Systems and West Sino Expositions, IEEE 2002 International Conference on , vol. 2, No., pp. 1784,1787 vol. 2, Jun. 29-Jul. 1, 2002.*

Tomizawa, M.; Yamawaku, J.; Takigawa, Yoshihiro; Koga, M.; Miyamoto, Yutaka; Morioka, T.; Hagimoto, K., "Terabit LAN with optical virtual concatenation for Grid applications with super-computers," Optical Fiber Communication Conference, 2005. Technical Digest. OFC/NFOEC , vol. 4, No., pp. 3 pp. vol. 4,, Mar. 6-11, 2005.*

Acharya, S. et al.: "Peso: Low overhead protection for Ethernet over SONET transport", INFOCOM 2004, Twenty-Third Annual Joint Conference of the IEEE Computer and Communications Societies Hong Kong, PR China, Mar. 7-11, 2004, Piscataway, NJ, USA, IEEE, Seiten 165-175, XP010740800.

Anonymous: "Link capacity adjustment scheme (LCAS) for virtual concatenated signals", International Telecommunication Union, Geneva, CH, Feb. 2004, XP017400828.

* cited by examiner

METHOD FOR TRANSMITTING DATA, AND NETWORK ELEMENT FOR A DATA NETWORK

CLAIM FOR PRIORITY

This application is a national stage application of PCT/EP2006/065030, filed Aug. 3, 2006, which claims the benefit of priority to German Application No. 10 2005 037 580.4, filed Aug. 9, 2005, the contents of which hereby incorporated by reference.

TECHNICAL FIELD OF THE INVENTION

The invention relates to a method for transmitting data and to a network element for a data network.

BACKGROUND OF THE INVENTION

Data are transmitted using data networks, such as networks in the synchronous digital hierarchy, SDH for short, or synchronous optical networks, SONET for short. These networks transmit data using virtual containers, VC for short. For this purpose, the data are inserted into virtual containers at the transmission end. The virtual containers essentially comprise a portion for useful data and a portion for overhead data, which are used for controlling, managing, administering, etc. the network or the containers. Virtual containers can be connected to one another to form concatenated virtual containers or linked virtual containers. These are also called virtually linked signal elements. A plurality of such virtual containers or concatenated virtual containers can be combined to form a virtual concatenated group, for example using the Link Capacity Adjustment Scheme, LCAS for short, on the basis of the ITU-T G.7042 standard. In this context, different concatenated virtual containers from a virtual concatenated group can be transmitted via different transmission sections or routes, paths or links in the data network. The (useful) data are inserted and removed in network elements in the data network, which are in turn connected to one another by various transmission paths.

The LCAS method can be used to insert data into a virtual concatenated group. The data in a virtual concatenated group are transmitted using (concatenated) virtual containers, these being transmitted from the source via various transmission sections to a sink/a destination. This is referred to as what is known as diverse routing. By way of example, a first group of virtual containers in a virtual concatenated group is transmitted via a first transmission link and a second group of containers in the virtual concatenated group is transmitted via a second transmission link. If the first transmission link fails in the event of a fault, LCAS is used to reduce the bandwidth of the virtual concatenated group by the quota of the portions routed via the failed link. That is to say that the connection is maintained but the bandwidth is reduced.

In the case of services which require or guarantee a stable bandwidth, this practice can result in unacceptable losses of quality.

SUMMARY OF THE INVENTION

The present invention improves the transmission of data via a data network.

One advantage of the invention is that splitting a virtual concatenated group into two sub virtual concatenated groups (first and second virtual concatenated groups) allows more flexible use and better utilization of the transmission capacity.

In one embodiment of the invention, the first virtual concatenated group is used to transmit data of a first type from a first data signal and the second virtual concatenated group is used to transmit data of a second type from a second data signal. This has the advantage that a virtual concatenated group transmits two data signals or client signals.

In another embodiment of the invention, the first virtual concatenated group is used to transmit higher priority data and the second virtual concatenated group is used to transmit low priority data. This has the particular advantage that when the virtual concatenated group is transmitted via different transmission paths or links and one link fails, the transmission capacity of the remaining link can be used exclusively or at least partly for transmitting higher priority data.

BRIEF DESCRIPTION OF THE DRAWINGS

An exemplary embodiment of the invention is explained in more detail below with reference to a drawing, in which.

DETAILED DESCRIPTION OF THE INVENTION

Figure 1:
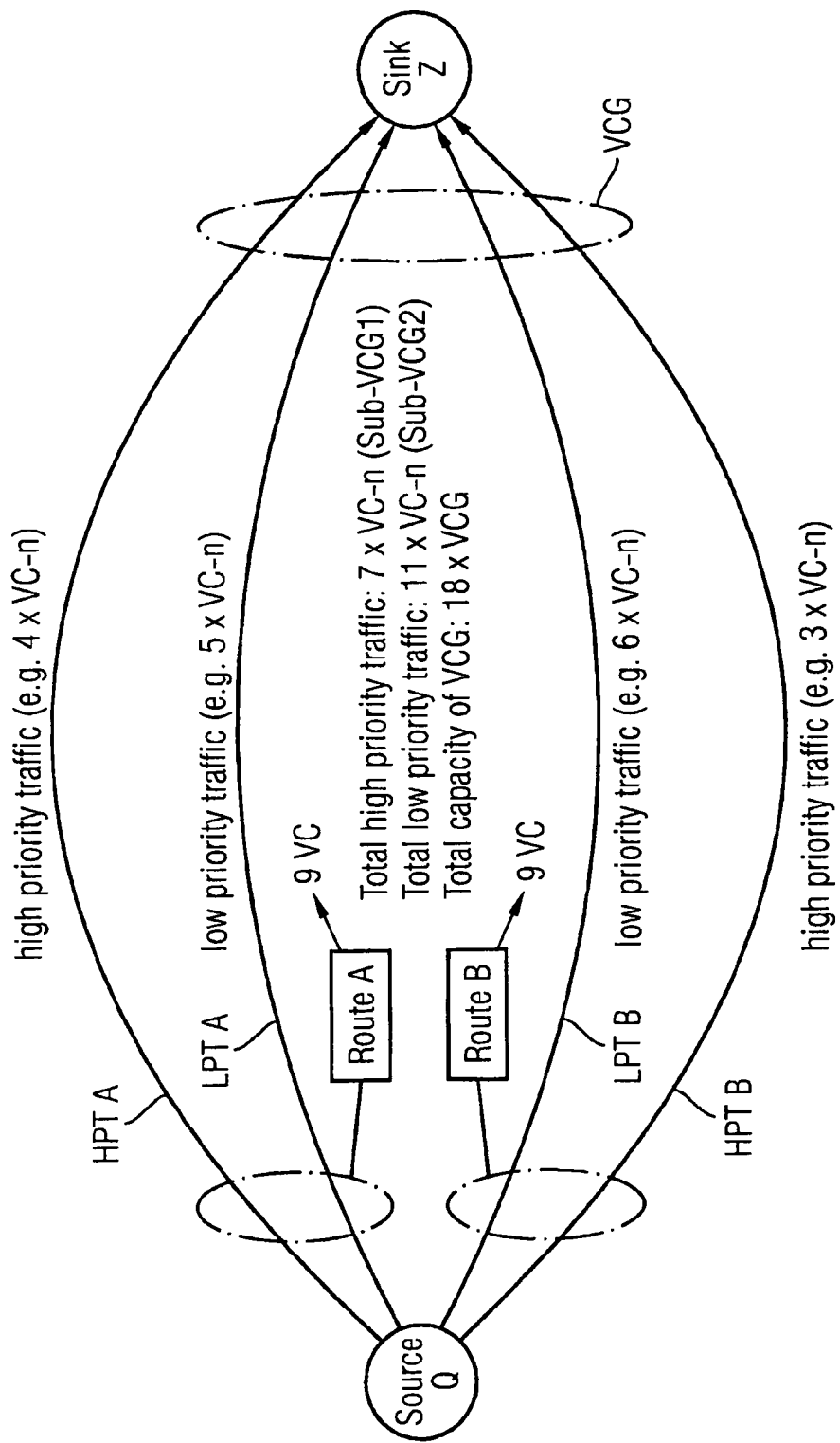
FIG. 1 shows a scheme for a data transmission.

FIG. 1 illustrates the principle of transmission in accordance with the invention. Data from a source Q are transmitted to a sink or to a destination Z. In this case, the source Q and the sink Z are a network element in a data or communication network. The network element of the source Q and the network element of the sink Z are connected to one another by means of two different transmission links, transmission paths, routes or links, which may be part of a data network which contains further network elements. That is to say that the transmission links may include further network elements, not shown. In the present case, the source Q is connected to the sink Z firstly by transmission link or Route A and secondly by transmission link or Route B.

In principle, the data are inserted into a virtual concatenated group VCG, in the example comprising 18 virtual containers, at the transmission end in the source Q. Half of the virtual containers in the virtual concatenated group VCG, that is to say 9 virtual containers, are transmitted via transmission link or Route A and the other half is transmitted via transmission link or Route B.

In line with the invention, the virtual concatenated group VCG is split into a first virtual concatenated group and a second virtual concatenated group. In the example shown in FIG. 1, the first virtual concatenated group comprises 7 virtual containers and the second group comprises 11 virtual containers, the first group being provided for higher priority data—high priority traffic—and the second group being provided for low priority data—low priority traffic. Similarly, the groups can also be provided for different data or client signals.

In addition, a first portion of the virtual concatenated group is transmitted via a first transmission path—Route A—and a second portion of the virtual concatenated group is transmitted via a second transmission path—Route B. In the example, a first portion of the virtual containers in the first virtual concatenated group is transmitted via the first transmission path Route A and a second portion of the virtual containers in the first virtual concatenated group is transmitted via the second transmission path Route B. In the present case, 4 virtual containers in the first virtual concatenated group, which comprises 7 virtual containers, are transmitted via the first transmission path Route A, which is shown as HPT A in FIGS. 1, and 3 virtual containers in the first virtual concatenated group are transmitted via the second transmission path Route B, which is shown as HPT B in FIG. 1.

Similarly, a first portion of the second virtual concatenated group is transmitted via the first transmission path—Route A and a second portion of the second virtual concatenated group is transmitted via the second transmission path—Route B. In the example, 5 virtual containers in the second virtual concatenated group, which comprises 11 virtual containers, are transmitted via the first transmission path Route A, which is shown in FIG. 1 as LPT A, and 6 virtual containers in the second virtual concatenated group are transmitted via the second transmission path Route B, which is shown in FIG. 1 as LPT B.

That is, the virtual concatenated group comprises 18 virtual containers, said virtual concatenated group comprising a first group of 7 virtual containers and a second group of 11 virtual containers, with 4 virtual containers in the first group being transmitted via Route A and 3 virtual containers in the first group being transmitted via Route B, and also 5 virtual containers in the second group being transmitted via Route A and 6 virtual containers in the second group being transmitted via Route B, so that 9 virtual containers are respectively transmitted via Route A (4+5=9) and Route B (3+6=9).

In the present case, higher priority data from the source Q are inserted by the latter into the first virtual concatenated group, and low priority data are inserted by the network element of the source Q into the second virtual concatenated group and are transmitted to the sink Z on the basis of the split described or another split. This can be done by a process which decides about the association of data with high priority or low priority traffic.

Figure 2:
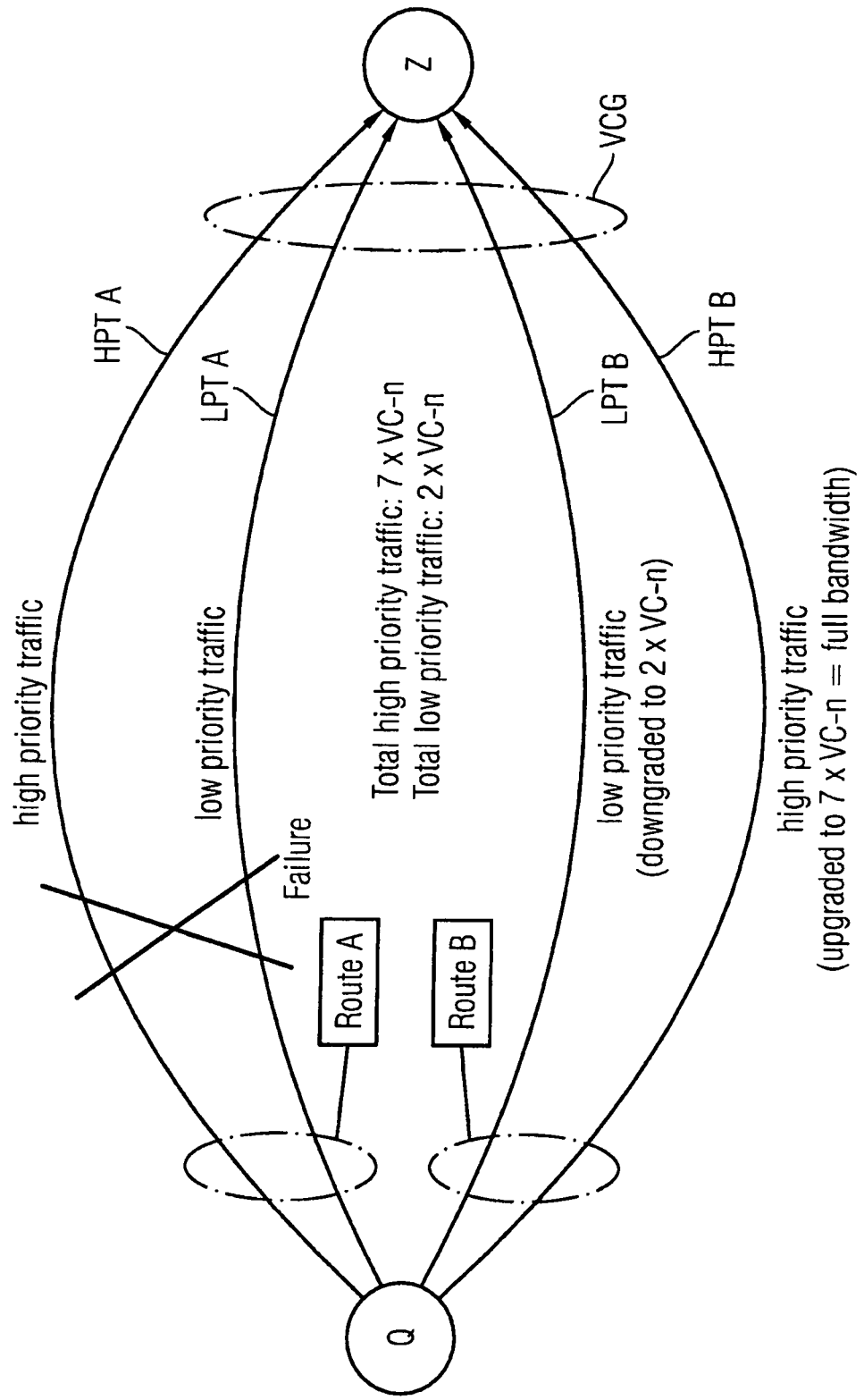
FIG. 2 shows a second scheme for a data transmission in the event of a fault.

FIG. 2 shows an illustration based on FIG. 1, with the difference that the transmission link Route A has a fault situation and is interrupted. In this case, the source Q detects the error and re-splits the data or the traffic. This is done by LCAS, for example. In this context, the remaining transmission path, Route B in the example, is used to transmit primarily data from the first virtual concatenated group, in the example with higher priority data, or high priority traffic.

In the present case, the first virtual concatenated group comprises 7 virtual containers. Subsequently, the data are re-split such that the 7 virtual containers in the first group are transmitted via the transmission path Route B and the remaining transmission capacity—if present —, 2 virtual containers in the example, is used for transmitting the data in the second group. In the example, the second group is downgraded and 2 virtual containers with the data from the second group or low priority traffic are transmitted via the transmission path Route B. That is to say that the connection for the low priority traffic is maintained, but it has its transmission capacity severely reduced.

The text below discusses the invention further. A virtual concatenated group VCG is split into a first "sub" virtual concatenated group, which is intended to transmit higher priority data, for example, and a second "sub" virtual concatenated group, which is intended to transmit low priority data, for example. Each of these sub virtual concatenated groups has a separate data signal or client signal inserted or fed into it, so that the two sub virtual concatenated groups are now used to transmit independent or separate data or client signals. To identify these separate sub virtual concatenated groups, the LCAS protocol is extended by control words, for example, which allows the sub virtual concatenated group or the associated transmission links to be controlled and identified. In this context, the CTRL field of the LCAS protocol will be used, for example. The low priority links and data are associated and the higher priority links and data are associated upon incorporation into the same virtual concatenated group VCG, with an upstream process deciding about the association of the data with high priority and low priority traffic.

The CTRL field of the LCAS protocol comprises 4 bits. The 4 bits allow 16 control words, of which ITU-T G.7042/Y.1305 (at 02/2004) defines or uses 6 words. It is also part of the invention to extend the control vocabulary by the required commands. Such extension is shown below by way of example. In the table below, the first column shows the 4-bit CTRL field of the LCAS protocol, the second column shows the previously defined commands for the control words which are possible therefrom, and the third column shows new commands for the inventive method.

| Value msb . . . lsb | Command LCAS | Command LCAS/low |
|---|---|---|
| 0000 | FIXED | FIXED |
| 0001 | ADD | ADD(-LP) |
| 0010 | NORM | NORM(-LP) |
| 0011 | EOS | EOS(-LP) |
| 0100 | Not used | Not used |
| 0101 | IDLE | IDLE |
| 0110 | Not used | Not used |
| 0111 | Not used | Not used |
| 1000 | Not used | Not used |
| 1001 | Not used | ADD-HP |
| 1010 | Not used | NORM-HP |
| 1011 | Not used | EOS-HP |
| 1100 | Not used | Not used |
| 1101 | Not used | Not used |
| 1110 | Not used | Not used |
| 1111 | DNU | DNU |

Some of the original commands, in the table the code words with the binary values 0001, 0010 and 0110, continue to be used with the same meaning. The new commands are inserted in lines 9, 10 and 11 of the table, i.e. the code words 1001, 1010 and 1011 are defined as new commands. To simplify the implementation, the bit pattern of these three new commands has been chosen such that they are identical to the "low priority" commands apart from the MSB.

If exclusively ADD(-LP) is used to set up subchannels, these behave exactly in line with the ITU-T G.7042 standard in the event of a link failure. This safeguards cooperation with existing LCAS systems or chips. If both ADD(-LP) and ADD-HP are used to set up channels, the low priority channels which are still available are overwritten with the higher priority channels in the event of a link failure, i.e. the data in the low priority channels are at least partly discarded in order to use the virtual containers which have become free to transmit higher priority data. The order of overwriting is obtained from the numbering of the channels.

On the basis of this, the switching operation shown in FIG. 1 and FIG. 2 for the configuration already described (Transmission link Route A has configured and activated four virtual containers for higher priority transmission and five virtual containers for lower priority transmission. Transmission link Route B has configured and activated three virtual containers for higher priority transmission and six virtual containers for lower priority transmission. The overall size of the virtual concatenated groups is 18 virtual containers. The size of the higher priority first virtual concatenated group is 7 virtual containers, and the size of the lower priority second virtual concatenated group is 11 virtual containers.) is as follows:

The control field of the LCAS protocol for the two transmission paths/routes is used to transmit the following values in the respective virtual container, for example:

| VC Number | CTRL |
| --- | --- |
| N1 | NORM-HP |
| N2 | NORM-HP |
| N3 | NORM-HP |
| N4 | NORM-HP |
| N5 | NORM(-LP) |
| N6 | NORM(-LP) |
| N7 | NORM(-LP) |
| N8 | NORM(-LP) |
| N9 | NORM(-LP) |
| N10 | NORM-HP |
| N11 | NORM-HP |
| N12 | EOS-HP |
| N13 | NORM(-LP) |
| N14 | NORM(-LP) |
| N15 | NORM(-LP) |
| N16 | NORM(-LP) |
| N17 | NORM(-LP) |
| N18 | EOS(-LP) |

If transmission path Route A fails, transmission path Route B is used to report the failure of the virtual containers on the transmission path Route A in the LCAS protocol (MST field). Consequently, all virtual containers on Route A are set to DNU (Do Not Use). In addition, Route B sets the number of lower priority virtual containers which is required for obtaining the higher priority bandwidth to ADD-HP. This is done starting from the virtual container with the lowest number. The virtual container with the CTRL field entry CTRL=EOS(-LP) is removed last. The interim state is as follows:

| VC Number | CTRL |
| --- | --- |
| N1 | DNU |
| N2 | DNU |
| N3 | DNU |
| N4 | DNU |
| N5 | DNU |
| N6 | DNU |
| N7 | DNU |
| N8 | DNU |
| N9 | DNU |
| N10 | NORM-HP |
| N11 | NORM-HP |
| N12 | EOS-HP |
| N13 | ADD-HP |
| N14 | ADD-HP |
| N15 | ADD-HP |
| N16 | ADD-HP |
| N17 | NORM(-LP) |
| N18 | EOS(-LP) |

The sink/the destination Z confirms the reduction in transmission bandwidth for the lower priority transmission and readiness to accept the higher priority transmission in the virtual container marked with ADD-HP, in line with the LCAS protocol with MST=OK for the relevant virtual containers. The source then sends NORM-HP and EOS-HP for the relevant virtual containers according to the stipulations of ITU-T G.7042. The final state is as follows:

| VC Number | CTRL |
| --- | --- |
| N1 | DNU |
| N2 | DNU |
| N3 | DNU |
| N4 | DNU |
| N5 | DNU |
| N6 | DNU |
| N7 | DNU |
| N8 | DNU |
| N9 | DNU |
| N10 | NORM-HP |
| N11 | NORM-HP |
| N12 | NORM-HP |
| N13 | NORM-HP |
| N14 | NORM-HP |
| N15 | NORM-HP |
| N16 | EOS-HP |
| N17 | NORM(-LP) |
| N18 | EOS(-LP) |

Overall, there are thus 9 virtual containers available for data transmission. Of these, 7 are used for higher priority transmission using the first group and two virtual containers are used for the lower priority second group.

To restore the previously failed transmission channels, there are two possibilities in principle: the first possibility "revertive" and the second possibility "non revertive". In the "non revertive" case, there is no reversion to the original transmission paths, i.e. to Route A, even after the transmission links or channels are available again or Route A has been repaired, but rather reversion takes place only upon failure of the transmission link or paths which is/are still active, in the example Route B. In the revertive case, the original virtual containers are enabled for transmission again by the standard LCAS protocol's relevant changes from DNU to NORM-(HP/LP). The signaling for the remaining transmission channels is adjusted accordingly. In the example above, this would attain the initial state again.

Downstream application of GFP subchanneling on the basis of ITU-T G.7041 and extension of the virtual concatenated group multiple frame protocol allows the method to be extended to more than two subchannels.

In summary, advantages of the invention will be repeated. The total physical bandwidth available can be used continually with the aid of the inventive method. In particular, no unused transmission links need to be kept available for link protection circuits.

The transmission for applications which require a stable bandwidth is protected completely. The bandwidth is also maintained in the event of error. Low priority data traffic is then rejected.

The transmission links can be configured such that low priority data never need to be rejected completely, which means that a minimum bandwidth for low priority data is also available in the event of a fault.

The switching takes place autonomously at the terminal points for the transmission or in the terminating network elements, which results in high switching speed. The inventive method cooperates with existing LCAS processes/methods.

The inventive method is also suitable for more than two groups or subchannels, e.g. as a result of Generic Frame Procedure, GFP for short, subchanneling on the basis of ITU-T G.7041 or as a result of extension of the multiple frame protocol for virtual concatenation ITU-T G.707.

The invention claimed is:
1. A method for transmitting data in a data network, comprising the steps of:
   in a network element at a transmission end of the data network:
     combining virtual containers using a Link Capacity Adjustment Scheme (LCAS) to form a virtual concatenated group (VCG);

splitting for internal processing in the network element the virtual concatenated group (VCG) in a first sub virtual concatenated group (Sub-VCG1) and a second sub virtual concatenated group (Sub-VCG2);

inserting user data of only a first type into containers of the first sub virtual concatenated group and inserting user data of only a second type into containers of the second sub virtual concatenated group;

combining the virtual containers of the first and the second sub virtual concatenated groups using the Link Capacity Adjustment Scheme to form a first portion of the virtual concatenated group (VCG) with one half of a virtual concatenated group (VCG) capacity, and combining further containers of both sub virtual concatenated groups (Sub-VCG1, Sub-VCG2) using the Link Capacity Adjustment Scheme to form to a second portion of the virtual concatenated group (VCG) with an equal capacity; and transmitting the first portion of the virtual concatenated group via a first transmission path, and transmitting the second portion of the virtual concatenated group via a second transmission path in the data network.

2. The method as claimed in claim 1, wherein the user data of the first type originate from a first data signal and the user data of the second type originate from a second data signal, so that the virtual concatenated group transmits two data signals or client signals.

3. The method as claimed in claim 1, wherein the first sub virtual concatenated group is used to transmit higher priority data and the second sub virtual concatenated group is used to transmit low priority data.

4. The method as claimed in claim 3, wherein in the event of a fault on a transmission path the remaining transmission path is used to transmit primarily data from the first sub virtual concatenated group.

5. The method as claimed in claim 1, wherein the first and second sub virtual concatenated groups are identified by an additional entry in a field associated with the LCAS protocol.

6. The method as claimed in claim 5, wherein the first and second sub virtual concatenated groups are identified by an additional entry in the CTRL field of the LCAS protocol.

7. A network element for a data network, comprising:
at least one device at a transmission end to perform:
combining virtual containers using a Link Capacity Adjustment Scheme (LCAS) to form a virtual concatenated group;

splitting for internal processing in the network element the virtual concatenated group (VCG) into a first sub virtual concatenated group (Sub-VCG1) and a second virtual sub concatenated group (Sub-VCG2);

inserting user data of only a first type into the first sub virtual concatenated group and inserting user data of only a second type into the second sub virtual concatenated group;

combining the virtual containers of the first and the second sub virtual concatenated group using the Link Capacity Adjustment Scheme to form a first portion of the virtual concatenated group with one half of a virtual concatenated group (VCG) capacity;

combining further containers of both sub virtual concatenated groups using the Link Capacity Adjustment Scheme to form to a second portion of the virtual concatenated group with an equal capacity; and transmitting the first portion of the virtual concatenated group via a first transmission path, and transmitting the second portion of the virtual concatenated group via a second transmission path in the data network.

* * * * *